United States Patent [19]
de Boer

[11] 3,840,760
[45] Oct. 8, 1974

[54] ELECTRIC VIBRATOR MOTOR
[75] Inventor: Jan de Boer, Drachten, Netherlands
[73] Assignee: U.S. Philips Corporation, New York, N.Y.
[22] Filed: Sept. 6, 1973
[21] Appl. No.: 394,563

Related U.S. Application Data
[63] Continuation of Ser. No. 294,643, Oct. 3, 1972.

[30] Foreign Application Priority Data
Oct. 14, 1971 Netherlands................ 7114172

[52] U.S. Cl................. 310/36, 310/37, 310/81
[51] Int. Cl................................. H02k 33/00
[58] Field of Search............ 317/19, 37, 38, 80, 81, 317/36

[56] References Cited
UNITED STATES PATENTS
| | | | |
|---|---|---|---|
| 3,155,855 | 11/1964 | Fitterer | 310/38 |
| 3,343,011 | 9/1967 | Daniels | 310/37 |
| 3,521,093 | 7/1970 | Harms | 319/19 |

Primary Examiner—J. D. Miller
Assistant Examiner—Harry E. Moose, Jr.
Attorney, Agent, or Firm—Frank R. Trifari

[57] ABSTRACT

Electric vibrator motor for use in dry shavers, massage devices and the like, which includes an armature adapted to oscillate against the action of at least one helical spring, in which motor the rest position of the armature poles relative to the stator poles is adjustable by means of a set screw which cooperates with an end of a spring, and furthermore the resonant frequency of the mass-spring system comprising the armature and the springs is also adjustable. The two adjustments are simultaneously effected by means of a single combined adjusting means which comprises a set screw on which a spring abutment is mounted, the axis of which does not coincide with the axis of the threaded part of the set screw.

6 Claims, 9 Drawing Figures

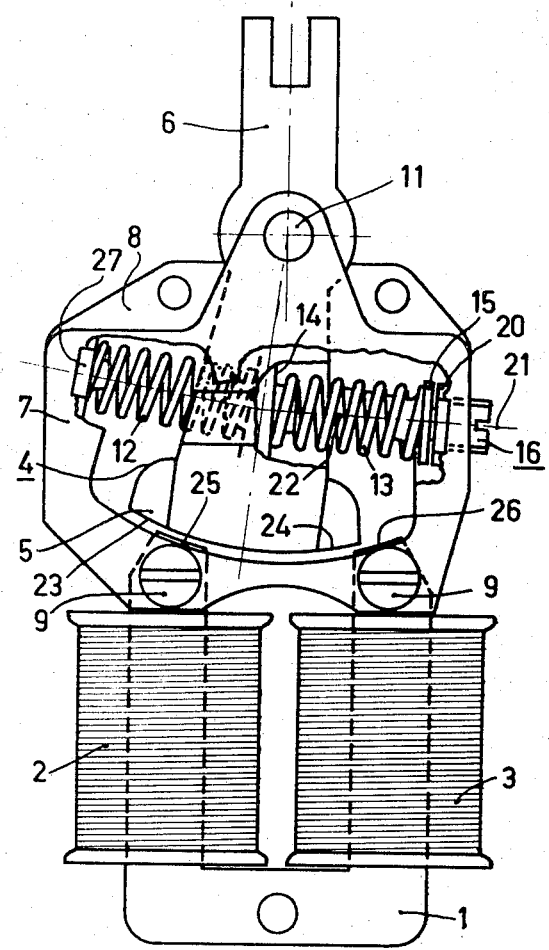
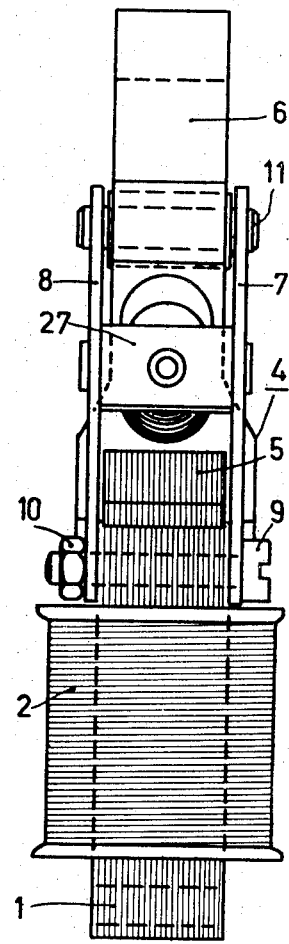
Fig. 1    Fig. 2
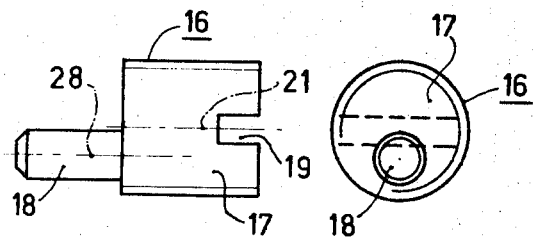
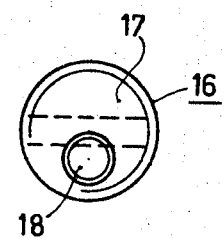
Fig. 3    Fig. 4

ELECTRIC VIBRATOR MOTOR

This is a continuation, of application Ser. No. 294,643, filed Oct. 3, 1972.

BACKGROUND OF THE INVENTION

The invention relates to an electric vibrator motor which includes a stator, an armature which is capable of oscillating with respect to the stator and at least one helical spring which tegether form. A mass-spring system, a first adjusting means comprises a set screw and a spring abutment and enables the rest position of the armature poles relative to the stator poles to be adjusted in that the end more remote from the armature of one of the springs is displaceable in the direction of the axis of the soring by turning the set screw. A a second adjusting means serves to adjust the resonant frequency of the mass-spring system.

Such a vibrator motor is described in French Patent Specification No. 1,280,472 which describes a vibrator motor in which a U-shaped laminated stator core carries a coil and is secured to a mounting plate. A pivot on which the armature is arranged for oscillation is secured to the mounting plate at right angles to the plane of the U. On each side of the armature is provided a helically coiled spring, one end of which bears on the armature and the other end bears against a spring abutment secured to the mounting plate. One of these spring abutments is fixed and the other is displaceable in the direction of the axis of the spring by turning a set screw. Owing to the fact that the helical springs have an integral, or at least approximately integral, number of turns, the resonant frequency of the mass-spring system can be set, irrespective of the adjustment of the rest-position of the armature, by rotating the springs about their axis. In this known motor the two springs are inclined at an angle to one another, so that rotation of a spring results in a small change of its effective spring constant.

It is common knowledge that vibrator motors for use in electric dry shavers, massage devices and the like cannot be manufactured with a degree of accuracy such as to enable all means of adjusting the rest position of the armature and the resonant frequency of the mass-spring system to be dispensed with. This is due to the fact that the various component parts which together constitute the vibrator motor cannot be manufactured within such close tolerances of their dimensions and properties as to provide a product which always without further provisions complies with the requirements to be satisfied. The adjusting means which consequently have to be incorporated in the motor obviously increase its price. However, the price of the motor is affected even more adversely by the adjusting operations to be carried out during its manufacture. Hence manufactures of vibrator motors of this type generally attempt to provide the motor with adjusting means which enable the adjustment of the motor to be effected with the smallest possible amount of effort in the smallest possible time, For this purpose it is of high importance that it should always be possible to check the effects of the adjusting operations. The significant parameters to be adjusted are the dynamic centre of the movement of the armature, which is to be understood to mean the position midway between the extreme positions between which the armature moves, the magnitude of the armature stroke, and the value of the electric current flowing through the motor. In a dry shaver, which almost invariably includes a shear foil when a vibrator motor is used the first two parameters are of importance because the cutter which is reciprocated by the vibrator motor is required to move substantially symmetrically with respect to the centre of the shear foil, and at the same time must have a stroke which corresponds to the longitudinal dimension of the shear foil.

It will be clear in view of the above, that the tendency will always be to use adjusting means which permit the adjustments to be performed on a vibrator motor during operation, for only then can the effect of the adjusting operations be continuously observed. Another feature which is always regarded as important is the possibility of adjusting one parameter without simultaneously influencing the other parameter, in other words: absence of interaction between the two adjustments is considered to be desirable.

The aforementioned known vibrator motor has several disadvantages. For example, adjustment of the resonant frequency of the mass-spring system comprising the armature and the two springs cannot be effected during operation of the motor. Secondly springs having an integral, or at least substantially integral, number of turns are required, which gives rise to certain problems of manufacturing technology, because helically coiled springs cannot readily be manufactured with turns numbers within close tolerances.

SUMMARY OF THE INVENTION

It is an object of the invention to obviate the said disadvantages, and the invention is characterized in that the two said adjusting means together form a single combined or dual adjusting means in that the axis of the said spring abutment does not coincide with the axis of the set screw.

Preferably an embodiment of the invention will be used which is characterized in the axis of the spring abutment is parallel with the axis of the set screw. Embodiments of the invention will now be described, by way of example, with reference to the accompanying diagrammatic drawings,:

BRIEF DESCRIPTION OF THE DRAWINGS

FIG. 1 is a front elevation of an electric vibrator motor for use in a dry shaver and provided with a combined adjusting means, part of a mounting plate and of a lever connected to the laminated armature core being omitted for clarity, FIG. 2 is a side elevation of the vibrator motor shown in FIG. 1, FIG. 3 is a side elevation of the set screw used in the vibrator motor of FIGS. 1 and 2, FIG. 4 is an elevation of the end of the set screw of FIG. 3 facing the associated spring of the vibrator motor.

DESCRIPTION OF THE PREFERRED EMBODIMENT

Figures 5, 6:
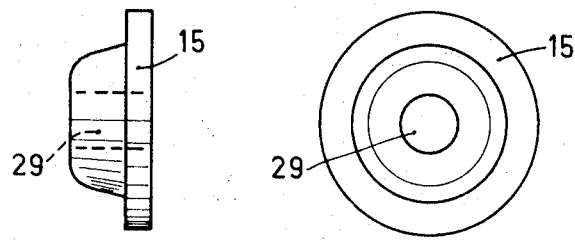
FIGS. 5 and 6 are a side and front elevation respectively of a separate spring abutment to be mounted on the set screw of FIGS. 3 and 4.

The vibrator motor shown in FIG. 1 has a U-shaped laminated stator core 1 on which two coils 2 and 3 are mounted. An armature 4 comprises laminations 5 and a lever 6 which is made of a synthetic material and to which the laminations 5 are firmly secured. Mounting plates 7 and 8 are arranged one on each side of the laminated stator 1 by means of two screws 9 and associated nuts 10, see also FIG. 2. The armature 4 is arranged to oscillate about a pivot 11 supported in the mounting plates 7 and 8. Helically coiled springs 12 and 13 are arranged one on each side of the armature 4 on opposite first and second surfaces facing the directions of movement. The left-hand end of the spring 13 bears on a spring abutment 14 which is integral with the bottom of a recess formed in the lever 6. The abutment 14 extends at right angles to the axis of the spring 13. The right-hand end of the spring 13 bears on a spring abutment 15 provided on the end of a set screw 16. As FIG. 3 shows more clearly, the set screw 16 comprises a part 17 provided with screwthread, a pin 18 integral with the threaded part and a slot 19 for the insertion of a screwdriver. The set screw 16 cooperates with a connecting plate 20 the ends of which are secured by riveting to the mounting plates 7 and 8 respectively. In the motor shown in FIG. 1 the arrangement is such that the axis 21 of the set screw 16 coincides with the axis 22 of the spring 13. If a screwdriver is inserted in the slot 19 in the set screw 16, turning the set screw 16 enables the spring abutment 15 to be displaced in the direction of the axis 22 of the spring 13, permitting the rest position of armature poles 23 and 24 of the armature 4 to be adjusted with respect to stator poles 25 and 26 of the stator 1. The spring 12 at one end bears against a connecting plate 27, which similarly to the connecting plate 20 is secured to the mounting plates 7 and 8 by riveting and serves as a spring abutment for the spring 12. The right-hand end of the spring 12 bears on a spring abutment, not shown, which is provided in the lever 6 and is similar to the abutment 14 for the left-hand end of the spring 13.

The axis 28 of the pin 18 of the set screw 16 does not coincide with the axis 21 of the threaded part 17 but is parallel therewith. The spring abutment 15, see in particular FIGS. 5 and 6, is provided with an opening 29 the diameter of which corresponds to the diameter of the pin 18, permitting the abutment to be fittingly and rotatably mounted on this pin 18. Thus, turning of the set screw 16 causes the end of the spring 13 to be displaced not only in the direction of the axis 22 but also in a direction at right angles thereto. As is known, the spring constant of helically coiled spring is changed by a relative displacement of the end planes of the spring in a direction at right angles to the spring axis. This means that when the rest position of the armature is adjusted the resonant frequency of the mass-spring system comprising the armature 4 in conjunction with the two springs 12 and 13 will simultaneously be changed. Rotation of the set screw 16 causes the rest position of the armature to be continuously changed and the resonant frequency of the mass-spring system to be periodically changed.

It has been found that contrary to current opinion among experts, this simultaneous, mutually not independent, adjustment of the two parameters is one of the attractive features of the invention.

What takes place when adjusting a motor as shown in FIGS. 1 and 2 will not be described with reference to the graph shown in FIG. 7. The graph is mainly illustrative and hence is not in every respect an exact representation of the process, but it closely approximates thereto.

The number N of complete revolutions of the set screw 16 is plotted as the abscissa of the coordinate axes, starting from an arbitrary initial position. The left-hand ordinate shows the electric current I consumed by the motor and expressed in milliamperes, and the other ordinate represents the stroke S of the driven cutter of a dry shaver expressed in millimetres.

A limit $I_{max}$ which the current consumed by the motor should not exceed is shown as a horizontal broken line. This limit is determined by the requirement that the temperature of the vibrator motor should not exceed about 70°C during operation.

A horizontal solid line indicates the level at which the nominal stroke $S_{nom}$ is reached, which in the case under consideration is 3.4 mms. Two solid horizontal lines above and below $S_{nom}$ indicate limits $S_{min}$ and $S_{max}$ respectively of the minimum and maximum acceptable strokes respectively. The values of $S_{min}$ and $S_{max}$ each lie at a distance of 0.5 mms from the value of $S_{nom}$. The graph shows two curves. The broken-line curve relates to the current I and the solid curve to the stroke S.

Adjustment of the motor starts from a position $N = 1$ of the set screw. The vibrator motor, which has already been built in in the housing of a dry shaver, is connected to the electric supply mains and so included in a suitable measuring arrangement that the motor parameters I and S which occur in operation can be continuously read from measuring instruments.

Turning the set screw 16, with the motor running, enables variations of the current I and of the stroke S to be observed roughly according to the curves shown. The screw 16 is turned until the curve of the stroke S first intersects the horizontal line $S_{nom}$, the point of intersection being designated A in the Figure. A value $N_{opt}$ of the variable N and a point B on the I-curve correspond to the point A.

The value $N_{opt}$ indicates that optimum adjustment of the vibrator motor is achieved, because this value of N represents a motor adjustment at which the stroke $S_{nom}$ is obtained at the lowest possible value of I. On further rotation of the set screw 16 beyond the value $N_{opt}$ of N, the curve of the stroke S will intersect the horizontal line associated with $S_{nom}$ several times, it is true, but at higher values of the current I consumed by the motor, eventually even at a value in excess of the permissible value $I_{max}$.

Figure 7:
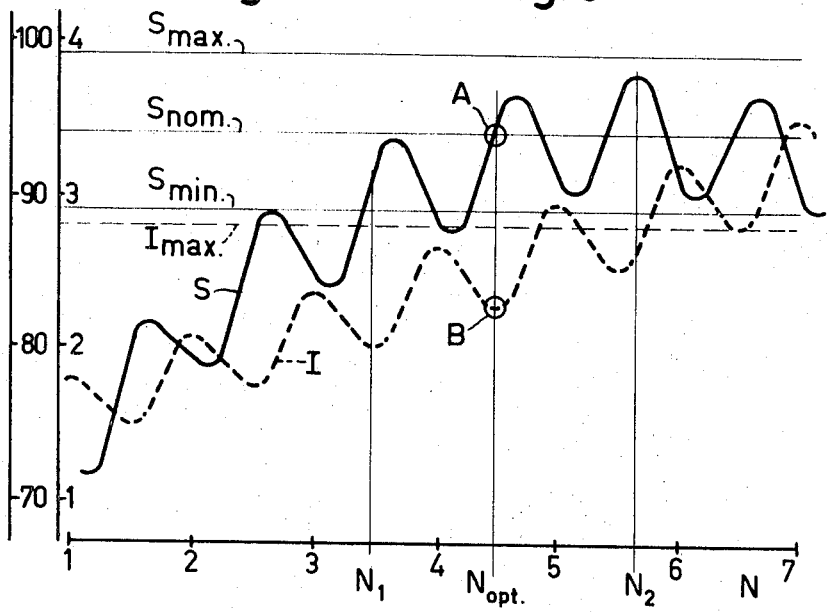
FIG. 7 is a graph which shows the influence of the turning of the set screw shown in FIGS. 3 and 4 on the stroke of, and the current consumed by, the vibrator motor shown in FIGS. 1 and 2, and FIGS. 8 and 9 show, simularly to FIGS. 3 and 4, an alternative embodiment of a set screw. In the Figures like component parts are designated by the corresponding reference numerals.

Obviously, in FIG. 7 any motor adjustment is acceptable in which the stroke S lies between the value $S_{min}$ and $S_{max}$ and the current I lies beneath the value $I_{max}$. Such permissible adjustments are found, for example, at $N = N_1$ and $N = N_2$, while in principle an unlimited number of other adjustments are permissible. However, in the operation of adjusting the motor, only the criterion for optimum motor adjustment need be used, i.e., the set screw 16 is to be turned until S first reaches the value $S_{nom}$, during which operation attention should be paid to the fact whether I does not exceed the value $I_{max}$.

In some motors the curve of S may not intersect the line associated with $S_{nom}$. In this case the set screw 16 must be turned in the opposite direction to find the highest value of S in the range above $S_{min}$ at which I does not yet exceed the value $I_{max}$. If such a setting is not to be found, the motor is to be rejected.

In FIG. 7 only two of the aforementioned three parameters to be adjusted in a vibrator motor for use in a dry shaver are plotted as ordinates. These three parameters are the dynamic centre of the movement produced, the stroke, and the consumed current. The first of the said three parameters, the dynamic centre, seldom or never gives rise to difficulty because of the rather wide tolerances which may be used in practice.

A large advantage, which so far has not been referred to, of the vibrator motor provided with combined adjusting means according to the invention is that the person required to adjust the motor needs to use only one hand for varying the quantity N, so that his or her other hand remains available for other operations, such as holding the respective dry shaver, operating the measuring apparatus used for the adjustment, and so on.

By proper proportioning of the values of the motor, optimum adjustment will be ensured in substantially all cases, so that in view of the simplicity of the aforementioned optimum criterion the adjusting operations may be performed in a very short time. In principle it is possible for the motor to be adjusted by an automatic machine which is provided with an adjusting tool which cooperates with the set screw 16 and the adjusting movement of which is automatically stopped when the measuring apparatus used finds the value $S_{nom}$ of the stroke S.

Figures 8, 9:
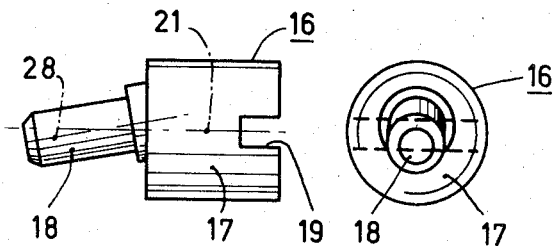

FIGS. 8 and 9 show a different embodiment of a set screw 16. In this set screw the pin 18 is inclined at an angle to the threaded part 17, so that the axis 28 of the pin 18 is inclined at an angle to the axis 21 of the part 17. Such a set screw may also be used. However, if the set screw 16 is to be manufactured on a lathe, the embodiment shown in FIGS. 3 and 4 is to be preferred in view of the parallelism of the axes 21 and 28.

The invention is not restricted to vibrator motors using a separate spring abutment 15, but also includes vibrator motors in which the end of the set screw 16 facing the associated helical spring also serves as a spring abutment integral with the set screw.

What is claimed is:

1. Electric vibrator motor which includes a stator, an armature which is adapted to oscillate with respect to the stator, and together with at least one helical spring forms a mass-spring system, a first adjusting means which comprises a set screw and a spring abutment and enables the rest position of the armature poles relative to the stator poles to be adjusted in that that end of one of the springs which is more remote from the armature is displaceable in the direction of the axis of the spring by turning the set screw, and a second adjusting means which serves to adjust the resonant frequency of the mass-spring system, characterized in that the two adjusting means together form a single adjusting means in that the axis of the said spring abutment does not coincide with the axis of the set screw.

2. Electric vibrator motor as claimed in claim 1, characterized in that the axis of the spring abutment is parallel with the axis of the set screw.

3. In an electrical vibrator motor which includes a frame carrying a stator with poles, an armature with poles that oscillates with respect to the stator about a pivot axis, the armature having first and second opposite surfaces facing its directions of movement, and at least one helical spring having one end abutting the first of said surfaces of the armature at a point spaced from said pivot axis, the spring also having a remote end and a central axis that is oriented generally normal to the pivot axis, the stator, armature and spring being a mass-spring system, the improvement in combination therewith of a dual-adjusting means comprising a set-screw that has a central axis and is mounted in the frame for rotation about its axis and axial displacement along its axis, a spring-abutment that extends from one end of said set-screw and has a central axis that is non-coincident with said set-screw axis, this spring-abutment engaging the remote end of the spring with the spring-abutment and spring axes aligned, whereby rotation of said set-screw and corresponding axial displacement of the set-screw adjusts the rest position of the spring and therefore of the armature and armature poles relative to the stator poles, and rotation of said set-screw also revolves said spring-abutment and remote end of the spring around the set-screw axis for adjusting the resonant frequency of the mass-spring system.

4. Apparatus according to claim 3 wherein said spring-abutment and set-screw axes are parallel.

5. Apparatus according to claim 3 wherein said spring-abutment axis is askew with and intersects said set-screw axis.

6. Apparatus according to claim 3 further comprising a second helical spring having one end abutting the second of said armature faces and a remote end engaged to said frame.

* * * * *

PO-1050
(5/69)

UNITED STATES PATENT OFFICE
CERTIFICATE OF CORRECTION

Patent No. 3,840,760　　　　　　　Dated  October 8, 1974

Inventor(s)  JAN DE BOER

It is certified that error appears in the above-identified patent and that said Letters Patent are hereby corrected as shown below:

Col. 1, line 10, "tegether" should be --together--; and

".A" should be --a-- line 11, after "tem" delete ",a" and insert --.A-- line 16, ".A" should be --; a--

Col. 4, line 6, "not" should be --now--

Signed and sealed this 17th day of December 1974.

(SEAL)
Attest:

McCOY M. GIBSON JR.　　　　　　C. MARSHALL DANN
Attesting Officer　　　　　　　　Commissioner of Patents